July 17, 1951

A. C. RUGE 2,561,317

MEASURING CIRCUIT FOR CONDITION
RESPONSIVE IMPEDANCES

Filed April 10, 1945

INVENTOR
Arthur C. Ruge
BY
ATTORNEY

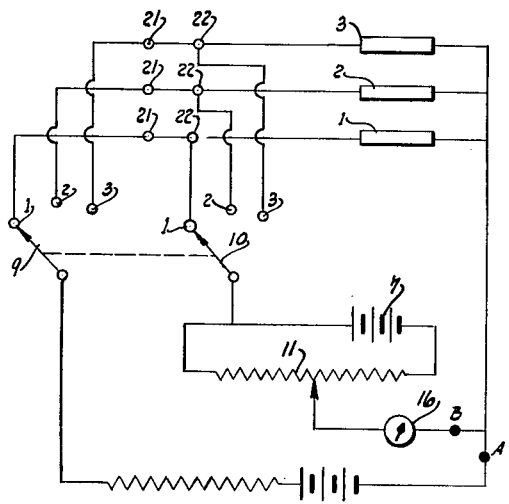
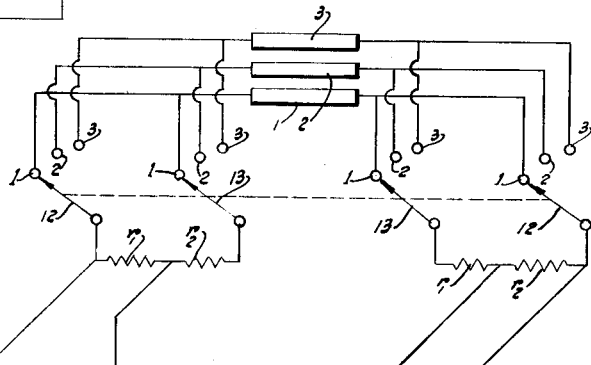
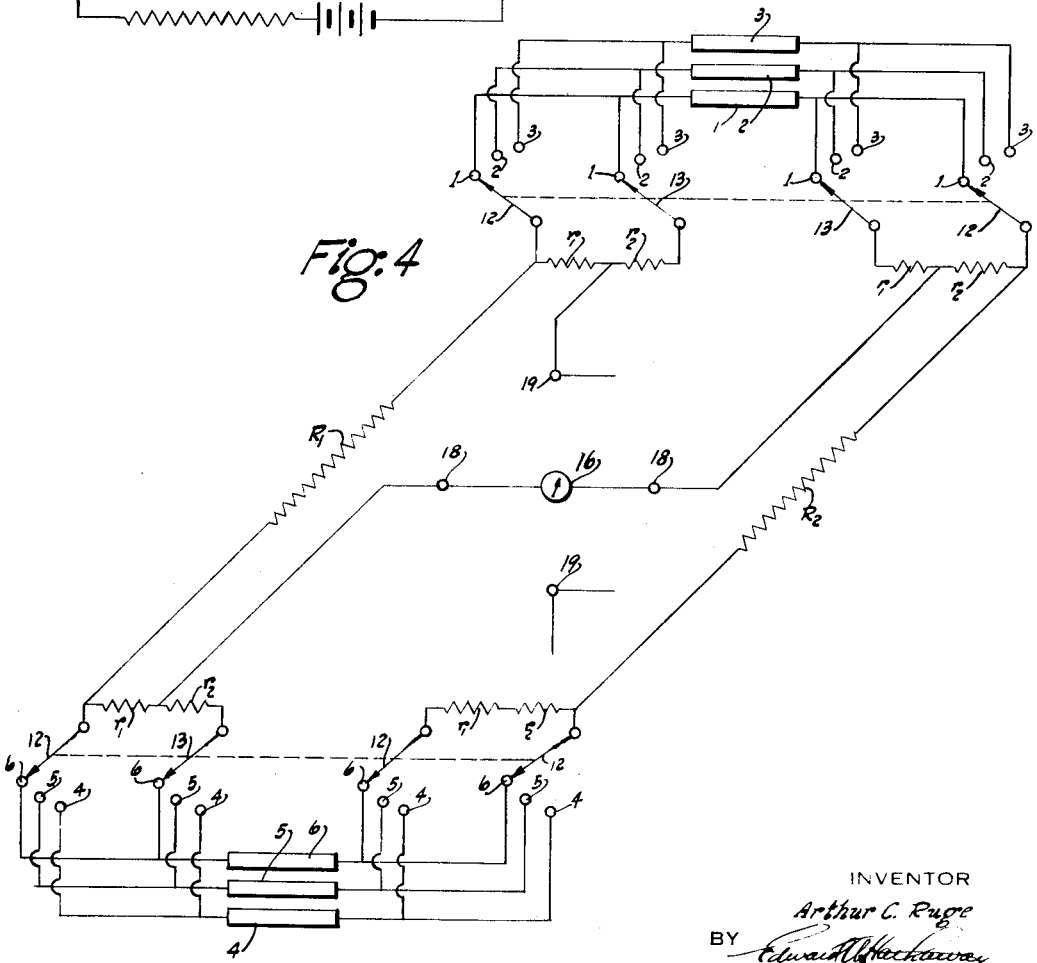

Patented July 17, 1951

2,561,317

UNITED STATES PATENT OFFICE 2,561,317

MEASURING CIRCUIT FOR CONDITION RESPONSIVE IMPEDANCES

Arthur C. Ruge, Cambridge, Mass., assignor to Baldwin-Lima-Hamilton Corporation, a corporation of Pennsylvania Application April 10, 1945, Serial No. 587,635

2 Claims. (Cl. 73—88.5)

The present invention relates generally to measuring apparatus, and more particularly for measuring conditions such, for example, among others, as torque, temperature, pressure, speed, accelerations, tension, compression, or strains arising from various causes, when the condition to be measured causes a change in the electrical impedance of a responsive element attached to a member or part undergoing test.

Apparatus of the type specifically disclosed herein employs, for purposes of illustration, a plurality of strain sensitive electrical impedance means adapted to be responsive to a condition to be measured, preferably but not necessarily by being mounted upon a member undergoing a test, so as to produce impedance changes responsive to potentially variable strains or conditions, the voltage changes being selectively transmitted to an indicating, measuring, or controlling device. One difficulty with this general type of apparatus resides in the variation of resistance in contacts which are necessary to use, such resistance not only being erratic as compared to the relatively small change of impedance to be measured, but is more often than otherwise higher than the change desired to be measured. Thus, a serious problem is presented in determining the amount of the impedance change, particularly if a high degree of accuracy is desired and especially when the strain sensitive means is of a relatively low impedance type.

It is an object of the present invention to provide an improved and simplified apparatus that is electrically responsive to a condition and is adapted to transmit a change of impedance in response to such condition with a high degree of accuracy, sensitivity and dependability.

A further object is to provide an improved apparatus including a measuring circuit in combination and selectively operative with a plurality of strain gages of the type providing small values of impedance change for a given change in strain.

Another object is to provide a measuring circuit in combination with a novel switching system wherein provision is made for successively connecting separate strain sensitive means into the measuring circuit and obtaining impedance measurements of the respective strain means uninfluenced by contact resistances.

Other objects and advantages will be more apparent to those skilled in the art from the following description of the accompanying drawings in which:

Fig. 4 is a diagram showing a further modification of the switching circuit of the invention;

Fig. 7 is a diagram illustrative of the use of a double binding post in the circuit of the invention of Fig. 1 of the drawings, such post assembly being adaptable to each of the circuit modifications illustrated.

Figure 1:
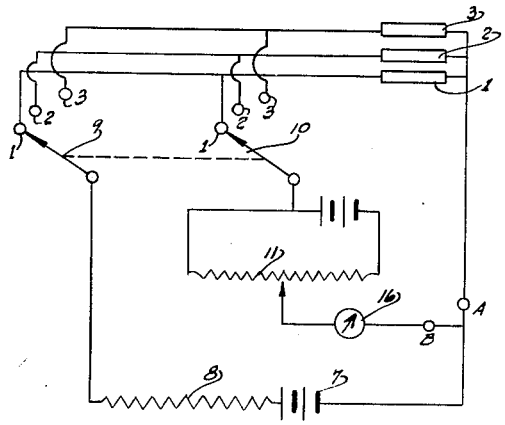
Fig. 1 is a diagram of a measuring apparatus, showing a switching circuit embodying one form of the present invention.

Referring to the drawings, Fig. 1 shows a wiring diagram of an improved switching circuit for switching a multiplicity of condition responsive means 1, 2, 3 into a potentiometer-type measuring system. Switch 9 feeds power selectively to these responsive means 1, 2 and 3 specifically shown herein as strain gages which, for purposes of illustration, may be considered to be of the type shown in Simmons Patent 2,292,549, although any other form of impedance means may be used. The power is supplied from a battery 7 and high resistance ballast resistor 8, the ballast resistor being for the purpose of maintaining a substantially constant current. To measure changes of resistance or impedance of elements 1, 2, 3 an auxiliary switch 10 is connected to a potentiometer diagrammatically indicated at 11. A detector 16, which may be a galvanometer or other suitable indicator, recorder, or controller, serves to indicate the unbalance between the potentiometer voltage and the voltage across the element being measured. Switches 9 and 10 are preferably ganged for convenience, indicated by a dashed line joining the switch rotors in this and other figures. The battery 7 and the battery of the potentiometer 11 may be replaced by suitably phased A. C. voltages. Each switch contact is connected to one of the responsive elements and hence corresponding contacts and elements have been given the same reference number for simplicity, although in Figs. 3 and 5 an additional set of responsive elements have been included and their numbers primed.

As a result of my improved switching circuit employing the main and auxiliary switches, I am able to use a strain gage or other variable impedance device adapted to have small values of impedance change, specifically shown herein as a resistance change, but without involving the difficulties incident to variable contact resistance at the switch points no matter how erratic such variation may be. This result is accomplished by reason of the auxiliary switch 10, which is in the measuring or responsive portion of the circuit, not being subject to the relatively large current flow from battery 7 through the strain gage. Instead, the current through auxiliary switch 10 is extremely small by reason of the potentiometer requiring a negligible current and hence variations in the switch contact resistance of switch 10 will not produce a voltage variation of sufficient magnitude compared to that produced by resistance change of the gage as to create any appreciable error. The voltage variations across the contacts of switch 9, no matter how large they may be, will not influence the voltage drop across the auxiliary switch 10 so long as the current through the gage is constant. Thus it is possible to use a strain gage or other impedance element of relatively low impedance such as 100 ohms without any adverse effects arising from variations in switch contact resistance through the auxiliary switch. This arrangement offers extraordinary improved results compared to those systems requiring high resistance gages to minimize contact errors or those requiring a very high quality expensive switch. In my improved circuit inexpensive commercially available switches may be used with a high degree of accuracy, sensitivity, reliability and simplicity.

For simplicity, the gages 1, 2, 3 are shown commonly connected at the right. Obviously, this end of each gage could be switched in to the circuit in the same manner as shown at the left, the rotors of switches 9 and 10 being connected at points A and B respectively. A further variation involves the use of two or more paralleled decks of switches 9 and 10 in order to further reduce the already small effect of contact resistance variations. In Fig. 1, for example, I might use a four-deck radio-type selector switch, paralleling two decks to form switch 9 and two decks to form switch 10. In this way I can get a very low contact resistance over the life of the switch. Such variations as described in this paragraph will be obvious to those skilled in the art and do not limit the scope of my present invention which has to do with the basic concept of the use of main and auxiliary switches.

In place of the ballast resistor 8, I may employ electronic means for maintaining constant current flow through the circuit, and in fact this may be preferable in many applications. Such electronic control is disclosed in my copending application, Serial No. 508,216, now Patent 2,423,620.

Figure 2:
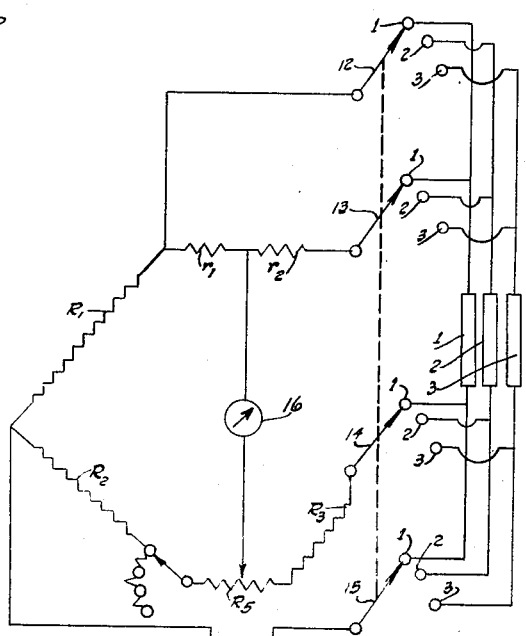
Fig. 2 is a diagram of a modified form of the invention.

Referring to Fig. 2, the arrangement maintains the desirable features of switching a single gage or other device of low impedance change into the measuring circuit but avoids the use of a large ballast resistor such as 8 in Fig. 1. Such large ballast resistors are used for the purpose of maintaining a constant current through the gage but this, in turn, means a relatively high voltage to obtain sufficient current flow through the gage. While in many instances a high voltage may not be objectionable, yet there are instances where there may be danger involved and trouble may develop from arcing in the switches carrying current to the gages. In Fig. 2 I eliminate the foregoing disadvantages by employing a relatively low voltage while at the same time maintaining a high degree of accuracy, sensitivity, and dependability. To accomplish this I employ a special bridge circuit in which the elements 1, 2, 3 form one arm, the circuit between the elements and the remainder of the bridge being completed by switches 12, 13, 14, 15. Resistances $R_1$, $R_2$, $R_3$ and $R_5$ form three arms of the bridge circuit, and means for adjusting the balance of the bridge is indicated schematically for convenience. The resistance $R_3$ is chosen to be very large relative to the contact resistance of switch 14, its value being say 10,000 or 100,000 ohms. Resistances $R_1$ and $R_2$ are chosen so as to balance the bridge in any convenient manner. Where temperature compensation is desired $R_1$ may be a dummy element corresponding to the active elements 1, 2, 3. A voltage divider $r_1$, $r_2$, is so chosen that the variable contact resistance of switches 12 and 13 does not produce appreciable effect upon the balance point of the bridge. A source of power is fed to the common connection of $R_1$ and $R_2$ and, by means of switch 15, is selectively fed to elements 1, 2, 3. Switch 12 selectively carries the current flowing through elements 1, 2, 3, to resistance $R_1$, thus completing the power circuit. Auxiliary switch 13 selectively connects elements 1, 2, 3, to one end of the voltage divider $r_1$, $r_2$. A second auxiliary switch connects elements 1, 2, 3 to resistance $R_3$.

In the operation of this Fig. 2 the resistance across auxiliary switch 13 will change the balance of the bridge only very slightly in relation to the resistance $r_2$ which, together with $r_1$, is shunting the already small contact resistance across switch 12. Also, the contact resistance across auxiliary switch 14 changes the balance of the switch only in relation to resistance $R_3$, which is chosen very much greater than the contact resistance across switch 14. The resistance across power switch 15 does not change the bridge balance at all but merely affects the sensitivity slightly. Now if this bridge is in balance, then the magnitude of the contact resistance across current switch 12 has no influence on the bridge balance. Since resistance $R_1$, is relatively low, a comparatively small voltage is required to produce the necessary current flow through elements 1, 2, 3. I have found in practice that I can use fixed values for $r_1$ and $r_2$ when switching a number of elements of similar resistance values into the circuit and still obtain very accurate results. This makes for simplicity in design and operation of the circuit.

Although I have shown elements 1, 2, 3 being switched in at both terminals, in many instances one or the other sets of terminals of the elements will be commoned, thus eliminating either switches 14 or 15, or switches 12 and 13. As will be evident to those versed in the art, Fig. 2 is illustrative only and many variations may be employed without affecting the scope of my invention. For example, the bridge arms may vary greatly in resistance from those shown and they may be made up of suitable impedances such as resistive, inductive, or capacitative, as desired. For purposes of clarity I have illustrated my invention with simple resistive elements.

Figure 3:
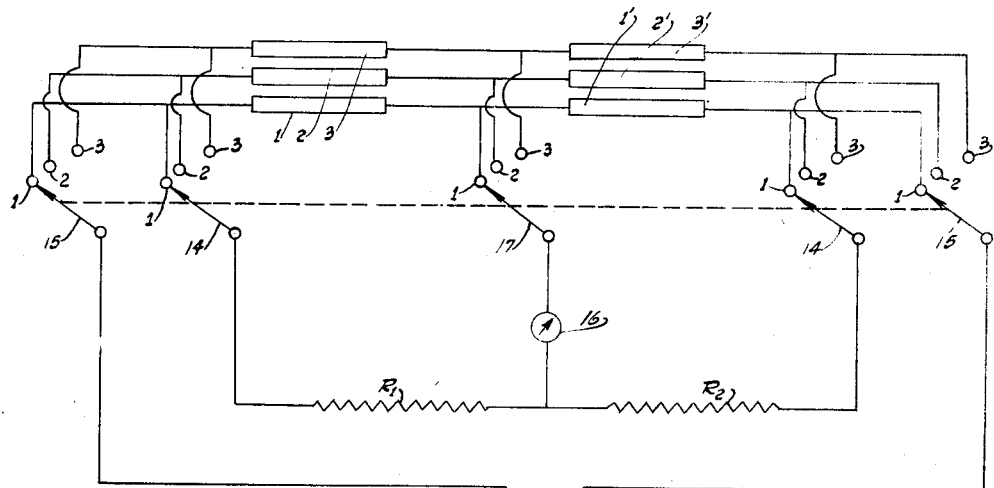
Fig. 3 is a diagram of another modification of the invention wherein a multiplicity of variable impedance devices are arranged in pairs.

In some applications, such as shown in Fig. 3, it is desirable to switch a multiplicity of elements in pairs such as 1 and 1', 2 and 2', 3 and 3', into the measuring circuit. For this purpose I employ current switches 15 to carry the current from the power source to the elements and I employ auxiliary switches 14 to connect the elements into a bridge circuit completed by resistance $R_1$ and $R_2$. Another auxiliary switch 17 serves to connect detector 16 between the commons of the pairs of elements and the common of $R_1$ and $R_2$ which are made large relative to the contact resistance of the auxiliary switches 14 and hence are negligibly affected by variations in the contact resistance. The contact resistance across switch 15 has no effect upon the bridge balance and only slightly affects the sensitivity. The contact resistance of auxiliary switch 17 obviously does not affect the bridge balance. As with any Wheatstone bridge, the battery and galvanometer may be interchanged if desired without impairing the functioning of the circuit. In most instances it will be permissible to common either one end of elements 1, 2, 3 thus eliminating one set of switches 14 and 15, or to common the junctions of the pairs of elements, thus eliminating switch 17.

This circuit has the advantage that arms 1 and 1', etc., may be differentially variable and yet compensate each other for temperature effects. Thus, 1 and 1' can be strain gages on opposite sides of a member subject to bending or they may be so disposed on a torsion or direct stress member as to vary differentially with the applied strain. The elements may also be devices differentially responsive to temperature or other functions, or they may for example be the two arms of a conventional two-arm electromagnetic strain gage, etc., without affecting the scope of my invention.

Figure 5:
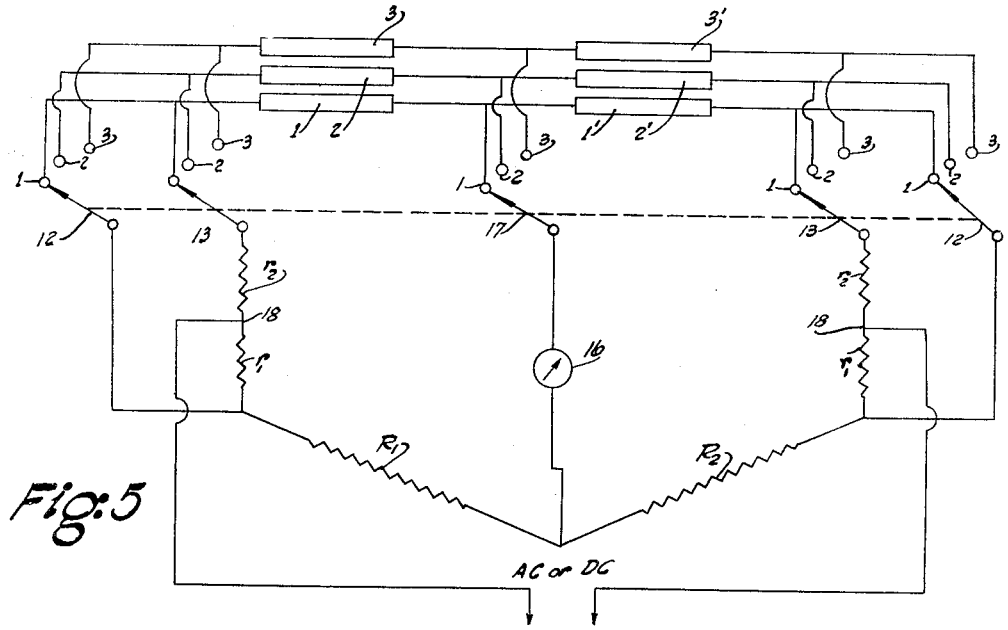
Fig. 5 is a diagram of a switching circuit of the invention more particularly for association with the measurement of differential temperature and strains.
Figure 6:
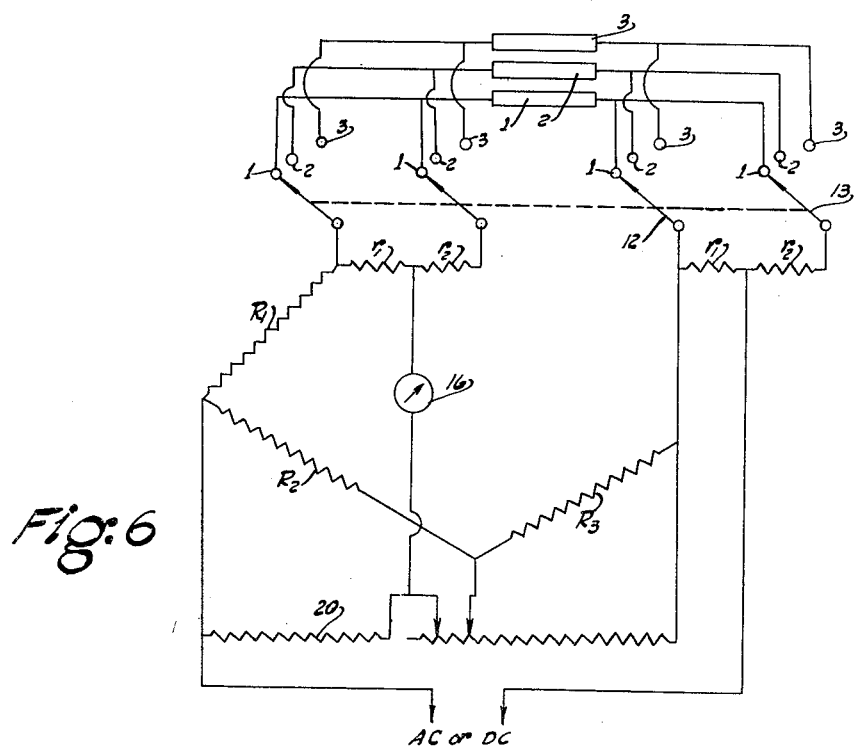
Fig. 6 is a diagram of a further modification of the invention.

In the modified forms of the invention shown in Figs. 4, 5 and 6, the switching circuits are improvements over the circuit of Fig. 2 in that they obviate the necessity of employing the high resistance arm $R_3$ and in that any or all arms of the bridge may be brought out through main and auxiliary switches. Corresponding parts of the various figures are given the same reference numbers even though several of these parts are found in Figs. 4, 5 and 6 in somewhat different arrangement from that of Fig. 2.

Fig. 4 shows how one or more arms of the bridge can be brought out through main and auxiliary switches without introducing appreciable errors due to switch contact resistance. It should be observed that arms $R_1$ and $R_2$ could be likewise carried out through switches so long as the main and auxiliary switches are used in the manner shown for bringing out the elements 1, 2, 3. The opposite "corners of the bridge" are marked 18 and 19. The power may be applied across either pair of like-numbered corners. Means for balancing the bridge are omitted as this feature is illustrated in Fig. 2 and is of conventional form not requiring illustration in every figure.

The essential feature of Figs. 4 and 5 is the use of the voltage divider and auxiliary switch circuit at each corner where an element is switched into the bridge. This permits the use of low impedance arms throughout if desired and is of value because the low impedance arms minimize the possibility of picked-up disturbances when used with electronic devices. It also makes it practical to use low-resistance galvanometers as bridge balance indicators.

Fig. 5 is a modified circuit which is useful when temperature compensation is essential or where differential temperature or strain measurements are to be made. This circuit gives as good results employing low resistance arms as does the circuit of Fig. 2 using high resistance arms $R_1$, $R_2$.

Fig. 6 embodies another modification of the circuit wherein a balancing device 20 is employed in connection with a circuit into which a multiplicity of elements or gages 1, 2, 3 are selectively switched. It should be recognized that any or all arms of the bridge may be brought out through switches after the teaching of Fig. 4, so long as the balancing circuit connects to the dividing point of the appropriate divider. Thus, in Fig. 4 or 5, the balancing circuit 20 can go across the points 18 or 19. This combination substantially eliminates errors both from contact resistance and power source variation.

I have shown throughout switching at both ends of the elements concerned for the sake of completeness. In many applications one or the other end of the elements would be commoned, thus eliminating one set of switches.

In the modification shown in Fig. 7 wherein the circuit of Fig. 1 is taken as illustrative, each gage 1, 2 and 3 or element to be measured is tied to two independent terminals or binding posts 21 and 22, of which the posts 21 are included in the respective circuits determined by the contacts under control of the main switch 9. The terminals or posts 22, however, are respectively included in the measuring circuits determined by the contacts under control of the switch 10. Thus, the posts 22 carry a potential to the measuring circuit while the posts 21 primarily carry current to the selected element to be measured. By this novel double post arrangement the current terminals or posts 21, which broadly constitute mechanical pressure-connecting means, are outside any potential of the measuring circuit and their resistance does not affect the accuracy of the measurement being taken. It is to be understood that the showing of the two terminal or binding post arrangements to the circuit of Fig. 1 is by way of example, and the same double binding post can be applied to all of the modified circuits shown, as will be readily understood.

From the disclosure of the several modifications, it is seen that I have provided a relatively simple method of switching a multiplicity of impedance elements into measuring circuits in such a way that small changes of impedance of said elements can be measured to a high degree of accuracy, sensitivity, and dependability, regardless of the existence of contact resistance at the switches. My improved circuits make it possible to accomplish these results with readily available inexpensive switches, the operation of switching being exceedingly simple and convenient.

It will, of course, be understood that various changes in details of construction and arrangement of parts may be made by those skilled in the art without departing from the spirit of the invention as set forth in the appended claims.

I claim:

1. Apparatus responsive to a change of condition to be measured comprising, in combination, a plurality of electrical impedance devices adapted to undergo a change of impedance in response to a change of the condition, a power circuit for supplying current to said electrical impedance devices including contacts for selectively connecting said devices into said power circuit, a second circuit responsive to changes of the electrical impedance of any one of the connected impedance devices including contacts for selectively connecting said devices into said second circuit in the same sequence as said power circuit selecting means, means also included in said second circuit for detecting said changes of impedance, and said power circuit also including a ballast resistor whereby variable changes in resistance across said power circuit contacts are relatively small compared to said resistor thereby to maintain a substantially uniform current flow through said power circuit, whereby the response of the detecting means is substantially independent of the resistance of said power circuit contacts.

2. The combination set forth in claim 1 further characterized in that said power circuit includes at least two mechanical pressure-connecting means which are independently electrically connected by mechanical pressure connection to a terminal of one of said electrical impedance devices, which terminal is to be selectively connected to said power and second circuits, one of said connecting means being electrically connected to the power circuit selective contact corresponding to said terminal and the other being connected to the second circuit selective contact corresponding to said terminal, so that the contact resistances at said mechanical pressure connections are respectively in series with the selective contact resistances of said power and second circuits.

ARTHUR C. RUGE.

REFERENCES CITED

The following references are of record in the file of this patent:

UNITED STATES PATENTS

| Number | Name | Date |
|---|---|---|
| 1,537,281 | Wunsch | May 12, 1925 |
| 1,593,024 | Macadie | July 20, 1926 |
| 1,665,397 | Wunsch | Apr. 10, 1928 |
| 2,256,395 | Laub | Sept. 16, 1941 |
| 2,285,118 | Jones | June 2, 1942 |
| 2,423,620 | Ruge | July 8, 1947 |

FOREIGN PATENTS

| Number | Country | Date |
|---|---|---|
| 541,942 | Great Britain | Dec. 18, 1941 |

OTHER REFERENCES

General Electric Review, May 1941, pp. 263–266.

Publication: "Resistance Wire Strain Gage Equipment for Static and Dynamic Testing" in Product Engineering, September 1945, pages 608–613.